(12) United States Patent
Peiffer et al.

(10) Patent No.: US 8,346,848 B2
(45) Date of Patent: Jan. 1, 2013

(54) SYSTEM AND METHOD FOR MAINTAINING STATEFULNESS DURING CLIENT-SERVER INTERACTIONS

(75) Inventors: Christopher Peiffer, Menlo Park, CA (US); Israel L'Heureux, Menlo Park, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2903 days.

(21) Appl. No.: 10/222,051

(22) Filed: Aug. 16, 2002

(65) Prior Publication Data

US 2003/0037108 A1 Feb. 20, 2003

Related U.S. Application Data

(60) Provisional application No. 60/313,006, filed on Aug. 16, 2001.

(51) Int. Cl.
*G06F 15/16* (2006.01)
(52) U.S. Cl. .......................... 709/203; 709/201
(58) Field of Classification Search ................. 709/203, 709/200, 228, 238, 250; 726/4
See application file for complete search history.

(56) References Cited

U.S. PATENT DOCUMENTS

| | | | |
|---|---|---|---|
| 5,826,261 A | 10/1998 | Spencer | |
| 5,828,840 A * | 10/1998 | Cowan et al. | 709/203 |
| 5,848,246 A * | 12/1998 | Gish | 709/228 |
| 5,850,517 A | 12/1998 | Verkler et al. | |
| 5,867,661 A | 2/1999 | Bittinger et al. | |
| 5,908,469 A * | 6/1999 | Botz et al. | 726/4 |
| 5,918,013 A | 6/1999 | Michdoll et al. | |
| 6,029,182 A | 2/2000 | Nehab et al. | |
| 6,052,718 A | 4/2000 | Gifford | |
| 6,058,428 A | 5/2000 | Wang et al. | |
| 6,076,108 A | 6/2000 | Courts et al. | |
| 6,078,953 A | 6/2000 | Vaid et al. | |
| 6,092,099 A | 7/2000 | Irie et al. | |
| 6,098,093 A * | 8/2000 | Bayeh et al. | 709/203 |
| 6,128,655 A | 10/2000 | Fields et al. | |
| 6,185,598 B1 * | 2/2001 | Farber et al. | 709/200 |
| 6,216,164 B1 | 4/2001 | Zaremba, Jr. | |
| 6,247,009 B1 | 6/2001 | Shiiyama et al. | |
| 6,266,369 B1 | 7/2001 | Wang et al. | |
| 6,269,357 B1 | 7/2001 | Nakayama et al. | |
| 6,275,301 B1 | 8/2001 | Bobrow et al. | |
| 6,304,676 B1 | 10/2001 | Mathews | |
| 6,434,559 B1 | 8/2002 | Lundberg et al. | |
| 6,446,028 B1 | 9/2002 | Wang | |
| 6,598,167 B2 | 7/2003 | Devine et al. | |
| 6,623,527 B1 * | 9/2003 | Hamzy | 715/234 |
| 6,718,390 B1 | 4/2004 | Still et al. | |
| 6,725,272 B1 | 4/2004 | Susai et al. | |
| 7,007,104 B1 | 2/2006 | Lewis et al. | |
| 7,010,573 B1 | 3/2006 | Saulpaugh et al. | |
| 7,373,395 B2 | 5/2008 | Brailean et al. | |
| 2001/0039586 A1 * | 11/2001 | Primak et al. | 709/228 |
| 2002/0042823 A1 * | 4/2002 | DeBettencourt et al. | 709/224 |
| 2002/0048269 A1 * | 4/2002 | Hong et al. | 370/389 |
| 2002/0062372 A1 * | 5/2002 | Hong et al. | 709/225 |
| 2002/0073165 A1 * | 6/2002 | McNulty et al. | 709/217 |

(Continued)

*Primary Examiner* — William Goodchild
(74) *Attorney, Agent, or Firm* — Shumaker & Sieffert, P.A.

(57) ABSTRACT

The present invention provides systems and methods for maintaining stateful interactions between clients and servers. Furthermore, the invention provides systems and methods for maintaining stateful interactions between clients and load balancers. In one embodiment, the present invention provides systems and methods for maintaining statefulness without the need for the server to query and/or store information on the client.

11 Claims, 15 Drawing Sheets

U.S. PATENT DOCUMENTS

| | | | |
|---|---|---|---|
| 2002/0161839 A1* | 10/2002 | Colasurdo et al. | 709/204 |
| 2002/0174194 A1* | 11/2002 | Mooney et al. | 709/219 |
| 2002/0191600 A1* | 12/2002 | Shah et al. | 370/389 |
| 2002/0194211 A1* | 12/2002 | Subramanian et al. | 707/500 |
| 2003/0028433 A1 | 2/2003 | Merriman et al. | |
| 2003/0133475 A1 | 7/2003 | Solheim et al. | |
| 2005/0027837 A1 | 2/2005 | Roese et al. | |
| 2006/0037075 A1 | 2/2006 | Frattura et al. | |
| 2007/0005731 A1 | 1/2007 | Lection et al. | |

* cited by examiner

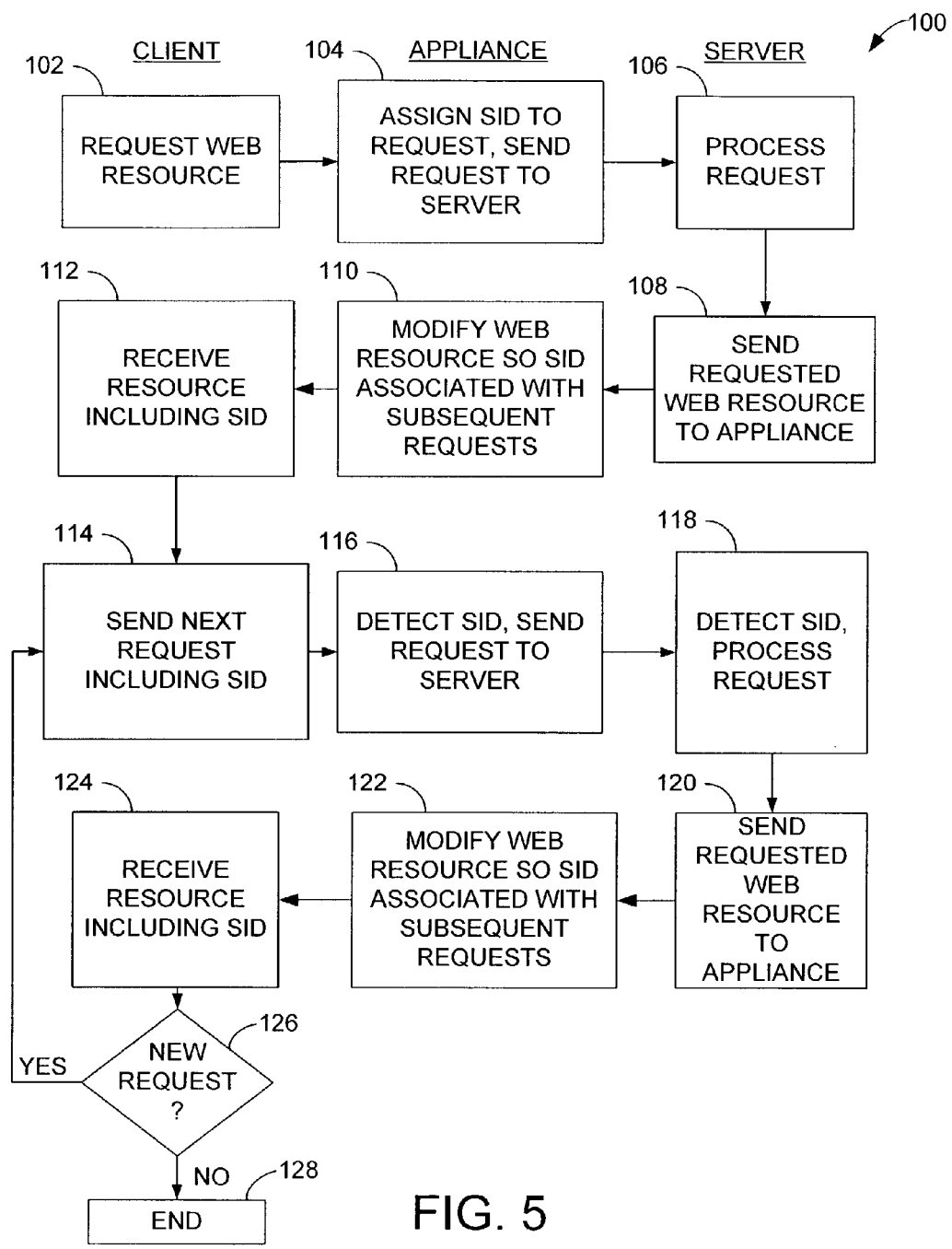

SYSTEM AND METHOD FOR MAINTAINING STATEFULNESS DURING CLIENT-SERVER INTERACTIONS

CROSS REFERENCE TO RELATED APPLICATION

The present application claims priority from U.S. Provisional Patent Application Ser. No. 60/313,006 to Christopher Peiffer and Israel L'Heureux entitled SYSTEM AND METHOD FOR IDENTIFYING A UNIQUE USER INTERACTING WITH A WEB SERVER, filed Aug. 16, 2001, the entire disclosure of which is hereby incorporated by reference for all purposes.

BACKGROUND OF THE INVENTION

HTTP is a stateless protocol, meaning that each request is independent from the previous or following request, i.e. no history of the interactions between the client and server, even during the same session, is maintained. However, typical business transactions are dependent upon past transactions, i.e. they require statefulness. Historically, maintaining statefulness has required that the server be able to identify the source of the request, i.e. the client, in order to determine what other requests that client has made.

One way to maintain statefulness is through the use of cookies. A cookie is a piece of data that the server stores on the client's hard drive. When a client and a server interact, i.e. when the client requests a first web resource from the server, the client browser searches the client's hard drive for a cookie that is associated with the server. If the browser finds an appropriate cookie, data associated with the cookie, such as a client session identifier, is sent to the server along with the request. This provides the server with the ability to maintain information, via a server-maintained lookup table or the like, about the particular client. If the particular cookie is not present, the server treats the client's request as a request from a new client, i.e. a client for whom no history has been maintained. The server may then "set" a cookie by writing an identifier or other piece of information to the client's hard drive. After the cookie is set, any new request made by the client will start a new exchange of cookie information.

As stated above, the server typically maintains a lookup table, in which the server maintains and updates the history of all web resource requests that involve a particular cookie. However, if the user erases the cookies on the client's hard drive, refuses to accept cookies, or accesses the server from a different client, the server cannot add new requests to the lookup table and statefulness will not be maintained.

The need for stateful interactions is not limited to client-server interactions. For example, load balancers act as network traffic directors, reducing net congestion by directing clients to available servers. However, when state logic is maintained on the web server, as is the case with the above-described lookup table, load balancers also need to be aware of specific users in order to direct subsequent requests to the same server. This is called "sticky" load balancing because the end user is "stuck" to a particular web server even through multiple requests.

The two most widely implemented approaches to sticky load balancing are cookie-based and IP-based. In cookie-based load balancing, the load balancer injects its own cookie into the request stream, such that when the user makes a request, the client sends a load balancer cookie along with the appropriate server cookie, if available. The load balancer then looks in a table to match the cookie to the target server. Upon making the connection to the target web server, the web server will read the request for a server-supplied cookie, and, if found, know the state or history of the client.

One complication with cookie-based load balancing is that the lifespan of the load balancer's cookie must be coordinated with the lifespan of the server's cookie. For example, if the load balancer invalidates its cookie on the client before the session between the client and the server is completed, the load balancer may send the client to a server that has no knowledge of the client or its state.

The second approach is IP-based stickiness, where the load balancer simply looks at the client's IP address and makes an entry in a hash table. Subsequent requests from the same IP address go the same target web server. Of course, the server still needs to set a cookie on the client's hard drive in order to maintain statefulness during the interaction. Some drawbacks to this approach are that all clients accessing through a given proxy server will share the same origin IP address, and thus be directed to the same web server. This can result in unbalanced loads. Also, typically a "rolling window" is used so that connections from IP addresses remain sticky for a rolling fifteen minute window. This window needs to be correlated to the cookie expiration time set by the server. Furthermore, if a client's IP address changes, for example, because the proxy server the client was connected to has changed, statefulness is lost.

Both existing approaches require the use of cookies. Consumers, however, have grown leery of cookies in general, and many end users disable the feature or delete them from their systems. In addition, many wireless network protocols do not enable cookies to be used. This has the substantial downside of limiting the growth of e-commerce and prohibiting other web content that requires state.

SUMMARY OF THE INVENTION

The present invention provides systems and methods for maintaining stateful interactions between clients and servers. In one embodiment, the present invention provides systems and methods for maintaining statefulness without the need for the server to query and/or store information on the client. Furthermore, the invention provides systems and methods for maintaining stateful interactions between clients and load balancers.

BRIEF DESCRIPTION OF THE DRAWINGS

FIG. 5 is a flowchart depicting a method for maintaining statefulness in interactions between clients and servers according to one embodiment of the present invention.

DETAILED DESCRIPTION OF THE PREFERRED EMBODIMENTS

Figure 1:
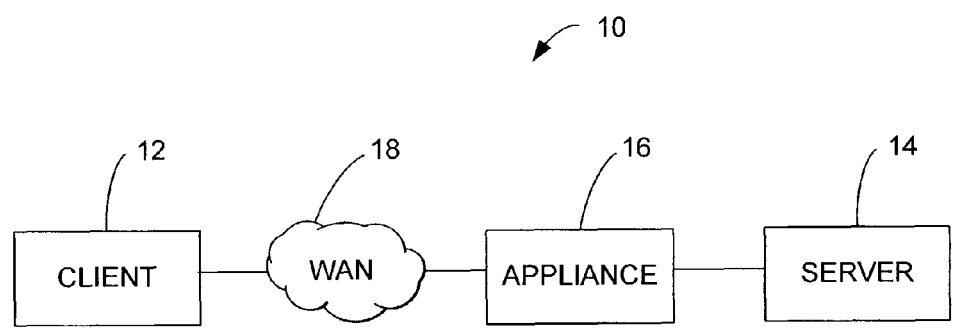
FIG. 1 is a schematic illustration of a system for maintaining statefulness during a series of interactions over a computer network according to one embodiment of the present invention.

In one embodiment, the invention provides a system and method for maintaining statefulness during a series of interactions over a computer network. An exemplary system is shown in FIG. 1 at 10, and typically includes a client 12 configured to communicate with a server 14 over network 18. The communications typically travel to and from client 12 and server 14 via appliance 16.

Figure 2:
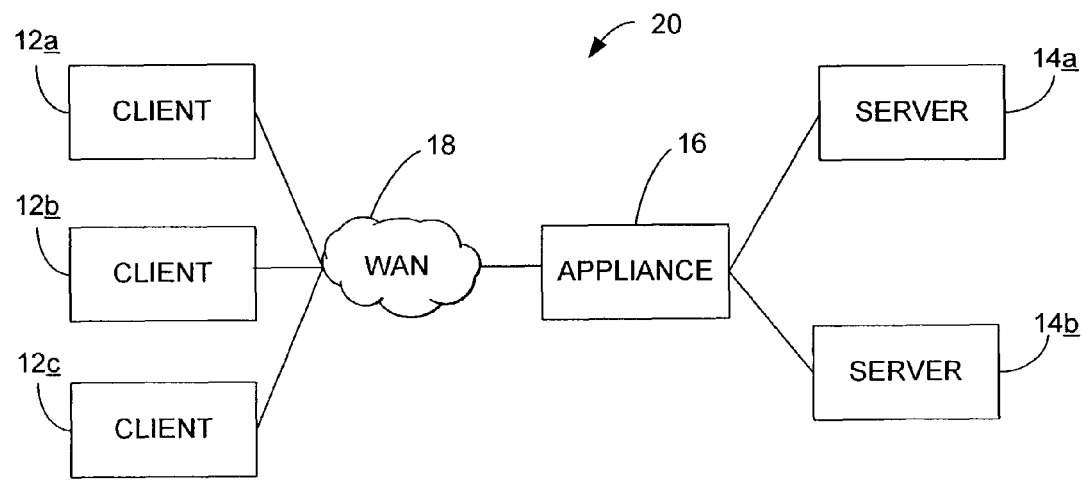
FIG. 2 is a schematic illustration of a system for maintaining statefulness during a series of interactions over a computer network including multiple clients and multiple servers according to one embodiment of the present invention.

A second exemplary system is shown in FIG. 2 at 20. This system includes multiple clients 12a, 12b, and 12c, which are configured to communicate with servers 14a and 14b over network 18. In this system, appliance 16 may be further configured to act as a load balancer, distributing the requests from clients 12a, 12b, and 12c between servers 14a and 14b.

Figure 3:
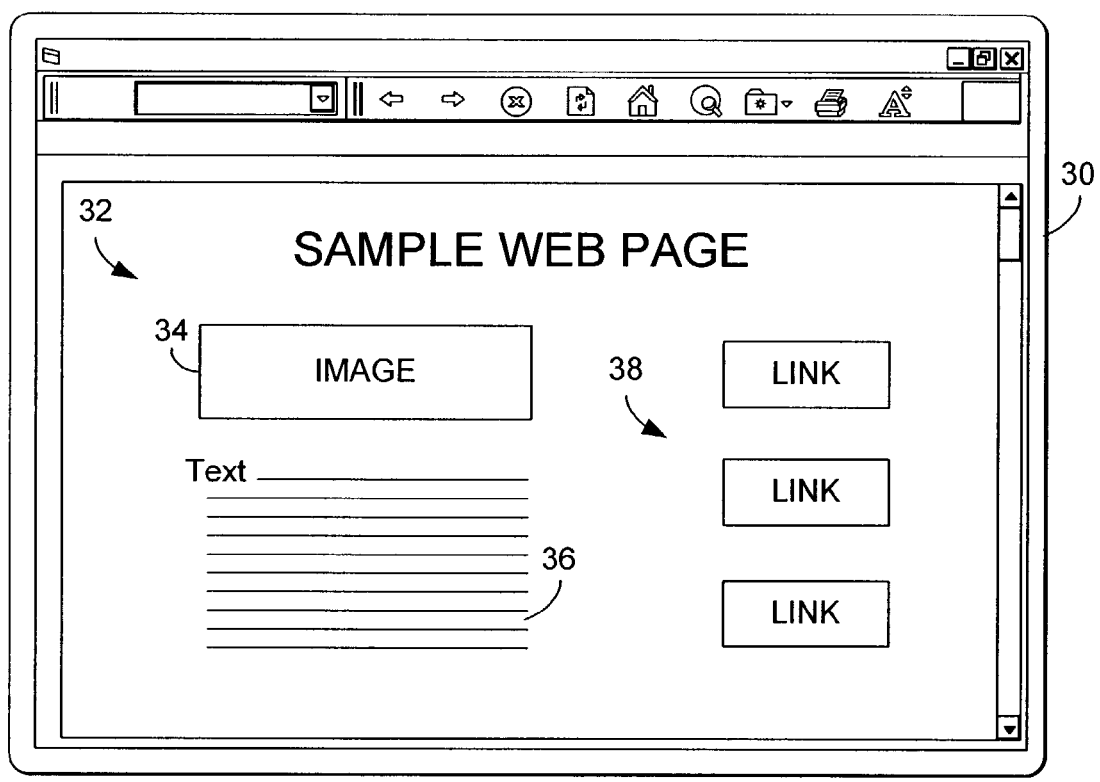
FIG. 3 is a schematic illustration of a typical client browser executed by the clients of the systems of FIGS. 1 and 2, shown displaying a web resource.

As shown in FIG. 3, client 12 is typically configured to run a browser 30 configured to display a web resource such as web page 32, which may have text 36, images 34, and/or hyperlinks 38. The term "web resource" as used herein refers to any data downloadable and presentable by a browser via the HTTP protocol, including HTML or web pages, images, sounds, etc.

Appliance 16 is typically configured to modify the messages sent back and forth between client 12 and server 14. This modification may take many different forms. However, for the purposes of the present invention, one of these modifications is the detection, addition, and/or deletion of one or more session identifiers (SIDs) associated with the messages. As will be described in greater detail in the application, the type and number of identifiers may vary depending on a variety of factors including the type and level of security desired in the system.

One suitable appliance according to the present invention is the acceleration device described in co-pending U.S. Patent Applications of Christopher Peiffer and Israel L'Heureux, U.S. application Ser. Nos. 09/680,675 for a NETWORK DATA TRANSFER ACCELERATION SYSTEM AND METHOD, 09/680,977 for an IMAGE AND TRANSFER SYSTEM AND METHOD, both filed Oct. 6, 2000, U.S. application Ser. No. 09/882,375 for a HTTP MULTIPLEXOR/DEMULTIPLEXOR, filed Jun. 15, 2001, PCT Application Serial No. PCT/US01/31854 for a HTTP MULTIPLEXOR/DEMULTIPLEXOR, filed Oct. 10, 2001, and Provisional Patent Application Serial No. 60/287,188 for A DATA TRANSFER SYSTEM AND METHOD, filed Aug. 16, 2002, each of which is incorporated by reference in its entirety for all purposes. The appliance may also be referred to as a load balancer because it may distribute request loads from a network connection to a plurality of servers.

Figure 4:
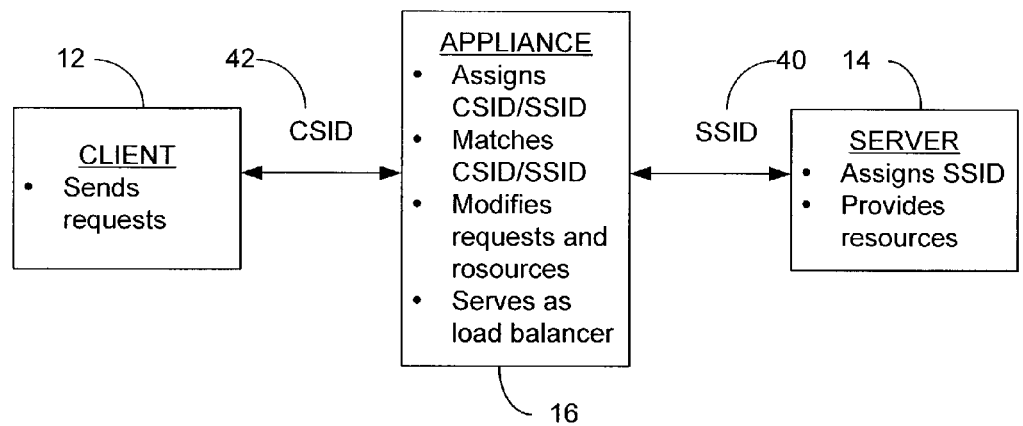
FIG. 4 is a schematic depiction of the session identifiers used to maintain statefulness between various components of the system according to one embodiment of the present invention.

A general description of the invention is provided with reference to FIG. 4. Initially, a user at client 12 makes a request for a web resource. For example, the user may input a URL for a desired web page into the web browser residing on the client. The client (via the browser) then sends a request to the web site's server 14 for the web resource. As will be explained in further detail below with regard to specific embodiments of the present invention, this request is typically intercepted by appliance 16, which may or may not modify the request before forwarding it on to the server.

Figure 4A:
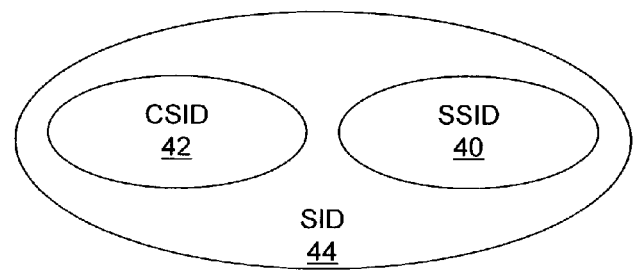
FIG. 4A is a diagram illustrating the relationship between the session identifiers of FIG. 4.

According to the present invention, one or more Session Identifiers (SIDs) are typically passed back and forth between the server and the client via the appliance to maintain stateful interactions. A single SID may be used, which may be assigned by the server or the appliance. Alternatively, a plurality of SIDS may be used, for example, both a Server Session Identifier (SSID) and a Client Session Identifier may be used, as discussed below. Where a single SID is used, the SSID and CSID may be said to be identical. As shown in FIG. 4A, the CSID and SID each are types of SIDs.

Stateful communication between the appliance and the server is may be achieved by the use of a server session identifier (SSID) 40. As will be described in further detail below, either the appliance or the server may assign the SSID. Examples of SSIDs include cookies and identifiers appended to the request or message during each transaction.

Where the SSID is established at the server, the resource is sent back to the appliance along with the SSID. The appliance then typically modifies the resource and before sending the resource to the client. As stated above, this modification may include the detection, addition, and/or deletion of any identifiers (such as the SSID) associated with the resource.

Stateful communication between the client and the server may be achieved by the use of CSID 42. As discussed above, in some cases, the CSID and SSID may be identical. For the purposes of the present invention, the CSID and SSID may be collectively referred to as Session Identifiers (SIDs) 44, which will be used to encompass both embodiments wherein the CSID and SSID are the same and those wherein the CSID and SSID are different, unless specifically stated otherwise.

As will be described in further detail below, the appliance typically assigns the CSID. However, in those embodiments wherein the server assigns the SSID and the SSID and CSID are the same, the server necessarily assigns the CSID as well. Examples of CSIDs include cookies and identifiers appended to the request or message during each transaction.

After receiving the first resource, the user may request a second resource from the same server. For example, the user may select and activate a link embedded in the originally requested resource. The client's browser then sends a request to the server for the new resource. As before, this request is initially received or intercepted by the appliance, where the message may be modified. Again, this modification may include the detection, addition, and/or deletion of any identifiers associated with the resource, as discussed in detail below.

Furthermore, the appliance may be configured to match the detected CSID with the appropriate SSID. This matching may take place through the use of a lookup table or the like. In addition, the appliance may serve as a load balancer, in which case the appliance may be configured to identify the appropriate sticky server for each request it receives.

Once the server receives the second request, the server processes the request and obtains the requested resource. The server may use the SSID to provide the client with a customized response, as described in further detail below. The response is then sent back to the appliance, where it may be modified as described above and forwarded to the client. Once the client receives the response, the user may select another web resource to view and the process may be repeated until the user terminates the session.

Figure 6:
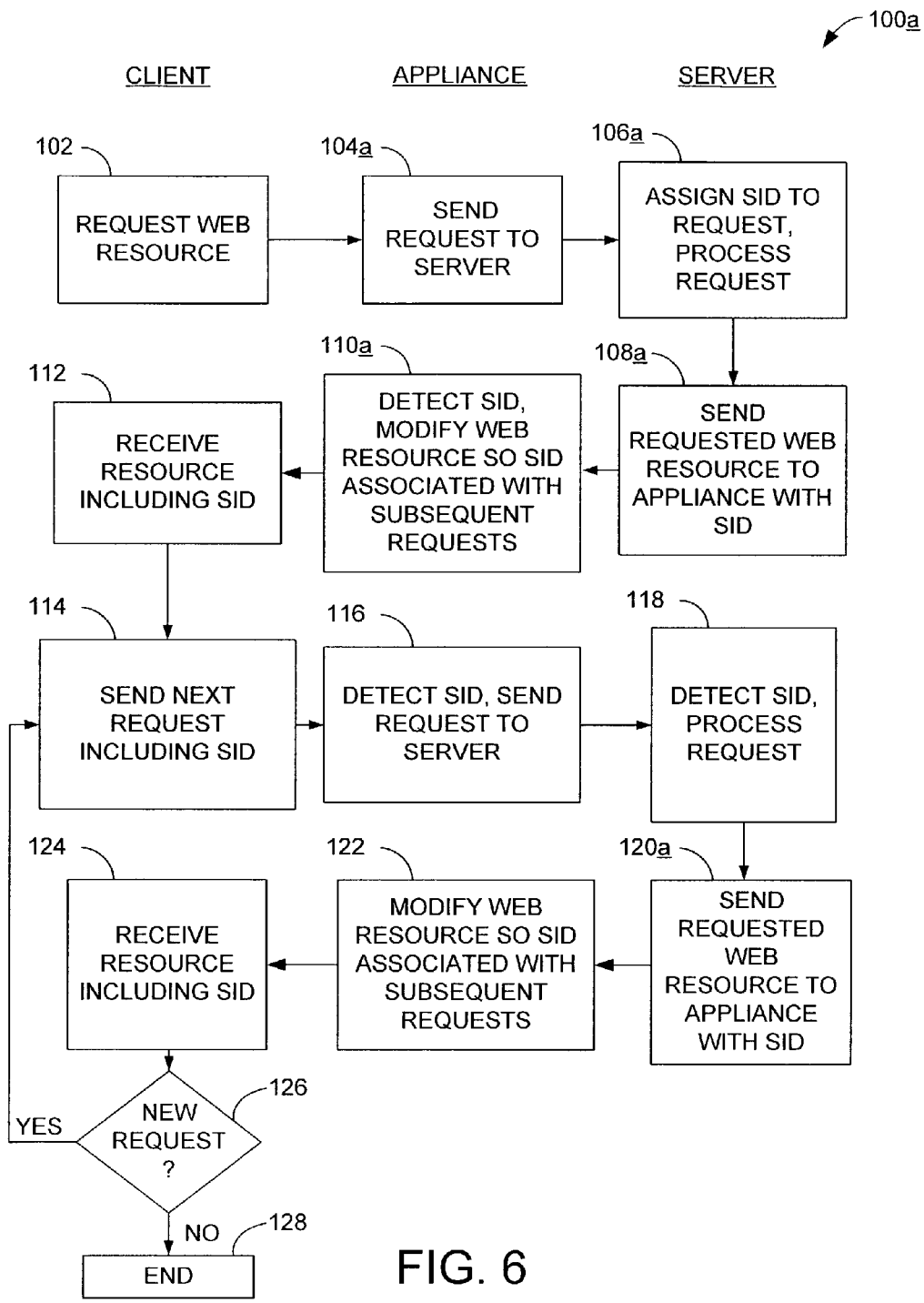
FIG. 6 is a flowchart depicting the method of FIG. 5 wherein the server assigns the Session ID (SID).

FIGS. 5 and 6 are flowcharts of methods 100, 100a according to embodiments of the present invention in which the client and server use a common Session Identifier (SID) to communicate with the appliance. As shown in FIGS. 5 and 6, according to methods 100 and 100a the client, at 102, typically requests a web resource from a server. At 104, 104a the request is initially received or intercepted by the appliance and then forwarded to the server for processing at 106, 106a. During this process the SID is assigned to the request by either the appliance (FIG. 5 at 104) or the server (FIG. 6 at 106a). As will be appreciated, the SID may take virtually any appropriate form suitable for identifying a session, including any combination of alphanumeric characters and symbols. For example, the SID may be a string appended to a hyperlink or URL, etc.

Whether assigned by the appliance or the server, the server may use the SID to maintain statefulness during the client's interaction with the server. For example, the server may store the SID in a lookup table and maintain a history of all transactions recorded under that SID during that session. This enables the server to provide resources specifically tailored, or customized, for the client.

Once the server receives the request, the server processes the request at 106, 106a and sends the requested web resource back to the appliance at 108, 108a. At 110, 110a, the appliance typically modifies the requested web resource such that the SID can be associated with subsequent requests originating from the modified resource. This modification may take place in a number of different ways as will be described in further detail below. Once the web resource is modified, the appliance sends the modified resource to the client, which receives the request at 112.

Thereafter, at 114, the client may send a new request to the server. This request, so long as it originates from the previously requested resource, will typically include the SID. At 116, the appliance intercepts the request before it is received by the server and detects the SID. If the appliance is acting as a load balancer, or if the appliance is configured to direct requests to multiple servers, the appliance may then determine which server to send the request to, based on the SID. Typically, the appliance will send the request to the server that processed the original request (i.e. the sticky server), which receives the request at 120, 120a.

Once the server receives the new request, the server may process the request, for example by detecting the included SID and supplying the requested resource in accordance with any information the server may have gathered about the client due to the presence of the SID. For example, the server may maintain a record of all previous requests including the same SID so that the web resource can be customized for the client, based on the client's past requests. The server may then send the customized resource back to the client, at 120, 120a. Again, at 122, the resource is first intercepted by the appliance, modified so that the SID will be associated with subsequent requests originating from the resource and then forwarded to the client. The process may be repeated as long as the client continues to send requests originating from resources that have been modified to be associated with the SID, as shown at 126, 128.

Figure 7:
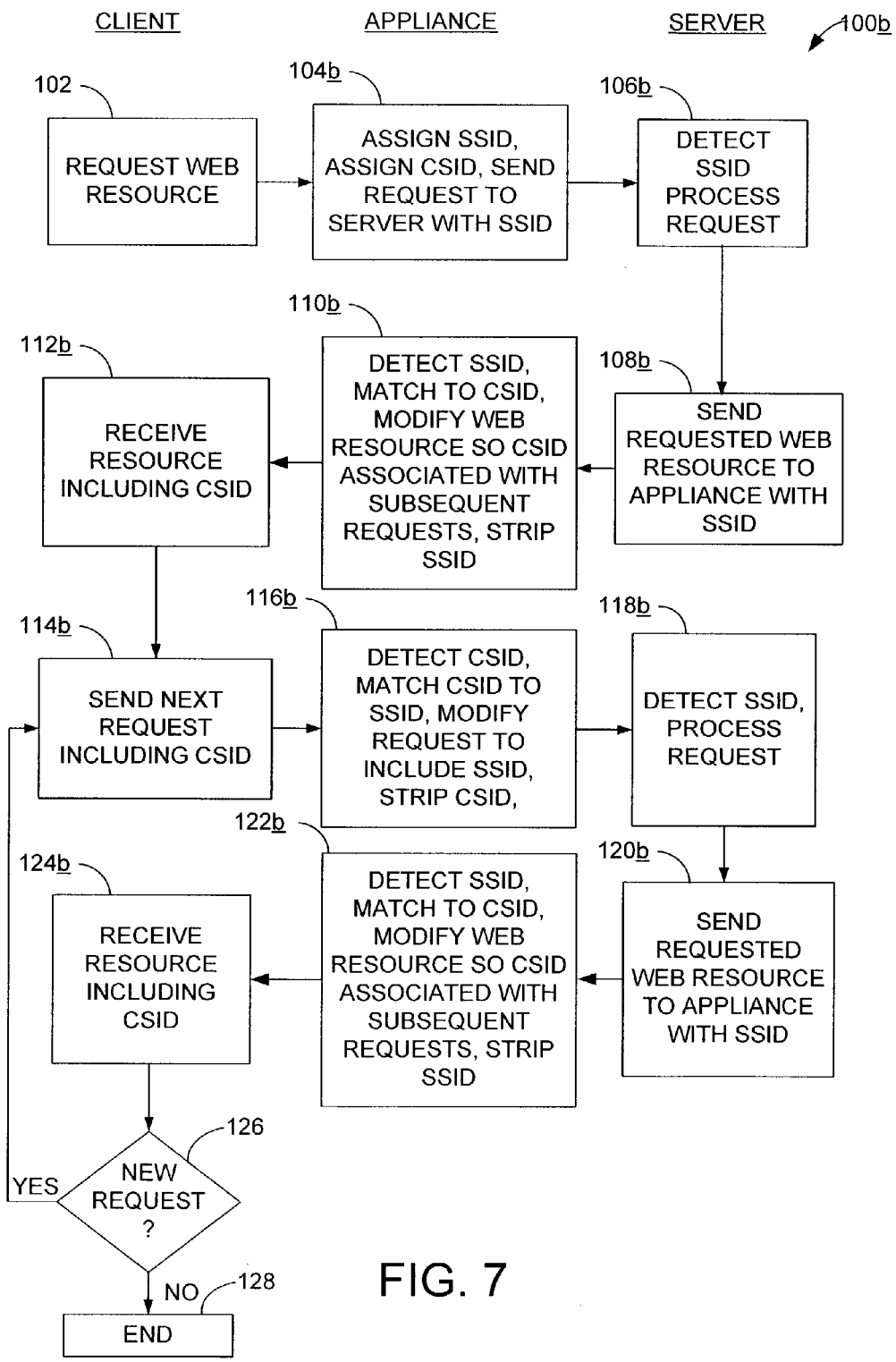
FIG. 7 is a flowchart depicting a method according to another embodiment of the present invention.
Figure 8:
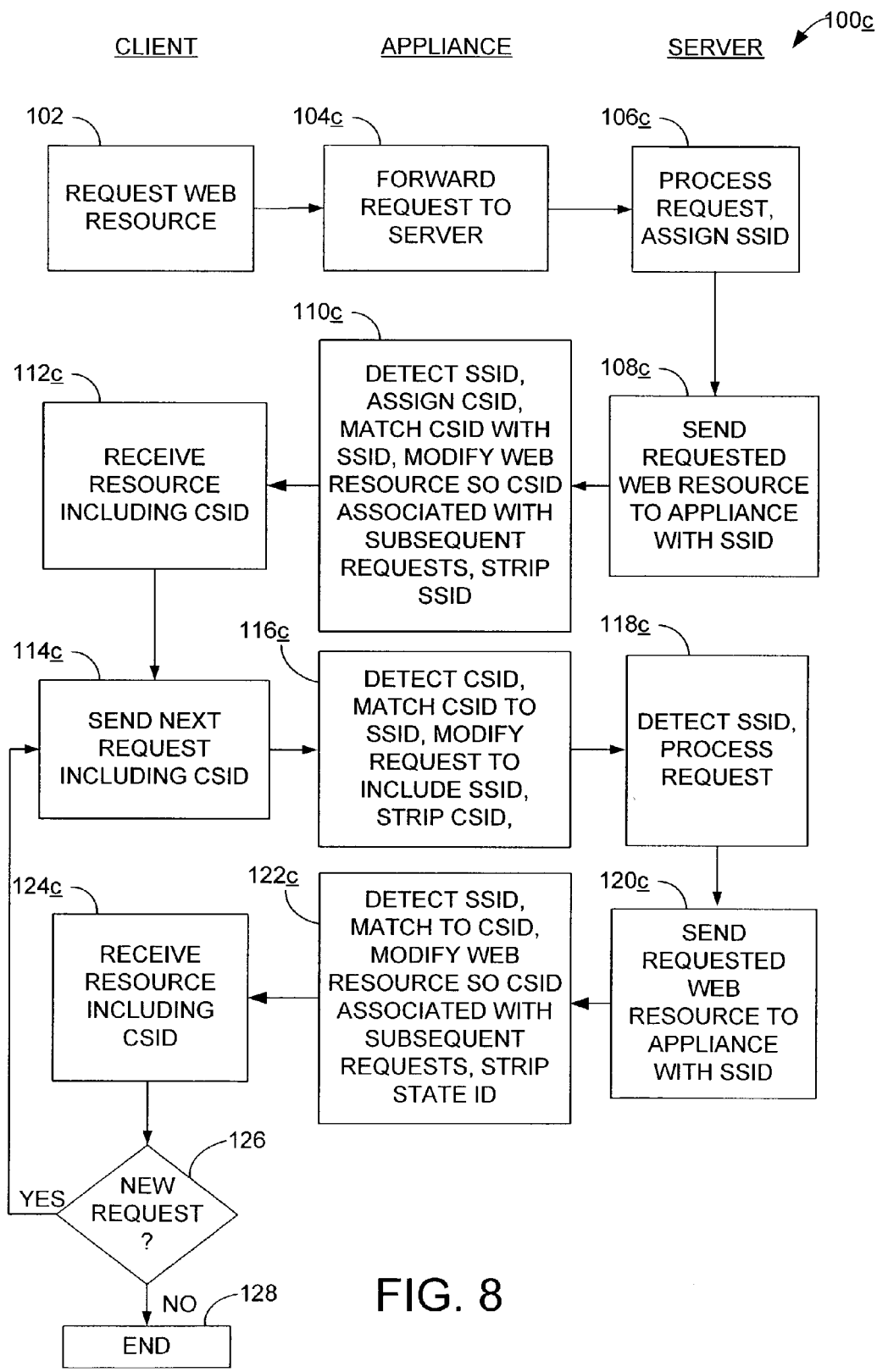
FIG. 8 is a flowchart depicting the method of FIG. 6 wherein the server assigns a Server Session ID (SSID).

Alternative embodiments of methods according to the present invention are shown in FIGS. 7 and 8 at 100b and 100c. In these embodiments, instead of using a common SID to maintain a stateful interaction between the client and the appliance and to maintain a stateful interaction between the client and the server, unique CSIDs and SSIDs are used. In these embodiments, the SSID is used to maintain statefulness between the server and the appliance and the CSID is used to maintain statefulness between the client and the appliance.

As described above, the appliance maintains an association between the SSID and the CSID such that the appliance knows that any requests associated with a particular CSID should be associated with the corresponding SSID and sent to the server that has previously received requests including that particular SSID. This association may be the multiplexing state agents described in U.S. application Ser. No. 09/882,375 for a HTTP MULTIPLEXOR/DEMULTIPLEXOR, filed Jun. 15, 2001, and PCT Application Serial No. PCT/US01/31854 for a HTTP MULTIPLEXOR/DEMULTIPLEXOR, filed Oct. 10, 2001, each of which is previously incorporated by reference above. These embodiments may be preferred when it is desirable to maintain virtually total anonymity between the client and the server.

As with the embodiments described above with respect to FIGS. 5 and 6, the client's initial request at 102 for a resource is received or intercepted first by the appliance at 104b, 104c, which forwards the request to the server for receipt at 106b, 106c. The appliance may assign both the CSID and SSID at 104b, before the request is forwarded to the server, as shown in FIG. 7. Alternatively, as shown in FIG. 8, the server may assign the SSID at 106c, and the appliance may assign only the CSID at 104c and/or simply forward the request to the server. At 108b, 108c, the server typically sends the requested resource back to the appliance with the server-assigned SSID. At 110b, 110c, the appliance may assign a CSID, if not already assigned, and associate the appliance-assigned CSID with the server-assigned SSID in a lookup table or the like.

Once the appliance receives the requested resource including the SSID from the server, the appliance may modify the resource at 110b, 110c. The resource may be modified in such a manner that any subsequent request originating from the requested resource will be associated with the CSID. For example, the CSID may be appended to hyperlinks or URLs with the requested resource. Moreover, the appliance may strip the SSID from the request, such that the client will have no knowledge of the SSID. The appliance may then send the requested resource, with the CSID or other modifications, to the client, which receives the resource at 112b, 112c. At 114b, 114c, the next request from the client that originates from the previously requested resource will thus include the CSID.

As with the embodiments shown in FIGS. 5 and 6, the appliance intercepts any such subsequent request at 116b, 116c. However, in these embodiments, the appliance detects the CSID rather than the SSID. The appliance then matches the detected CSID with the previously assigned SSID. Prior to forwarding the request to the server, the appliance may add the SSID to the request to maintain the stateful interaction between the client and the server. Furthermore, the appliance may strip the CSID from the request such that the server has no knowledge of the client's identity.

Once the server receives the request including the SSID at 118b, 118c, the server may detect the SSID and provide a customized response based on prior transactions, etc. at 120b, 120c. The server may then send the customized response back to the appliance to be modified and forwarded to the client at 122b, 122c.

As stated above, in order to maintain statefulness, the appliance typically is configured to identify the origin of a series of requests emanating from a particular client. Among other benefits, this enables the appliance to direct a given client's request to the appropriate sticky server within a server group. According to the embodiments described above, client recognition may be achieved by modifying the requested resource such that any subsequent client request originating from the server-supplied resource can be associated with the requesting client, via a previously assigned session identifier such as a CSID.

As one example, this modification may involve the appliance appending a SID to the requested resource. Typically, the appliance appends the SID to the requested resource in a manner such that any request originating from the requested resource will itself include the SID.

One method for appending the SID to the requested resource includes rewriting the resource's Uniform Resource Locator (URL) links or content location header to include the SID. As previously described, the appliance receives the requested resource from the server before it is forwarded to the client. The requested resource may be, for example, a web page including one or more links to other web resources, including other web pages. Each of these links is typically identified by a URL.

Figure 9:
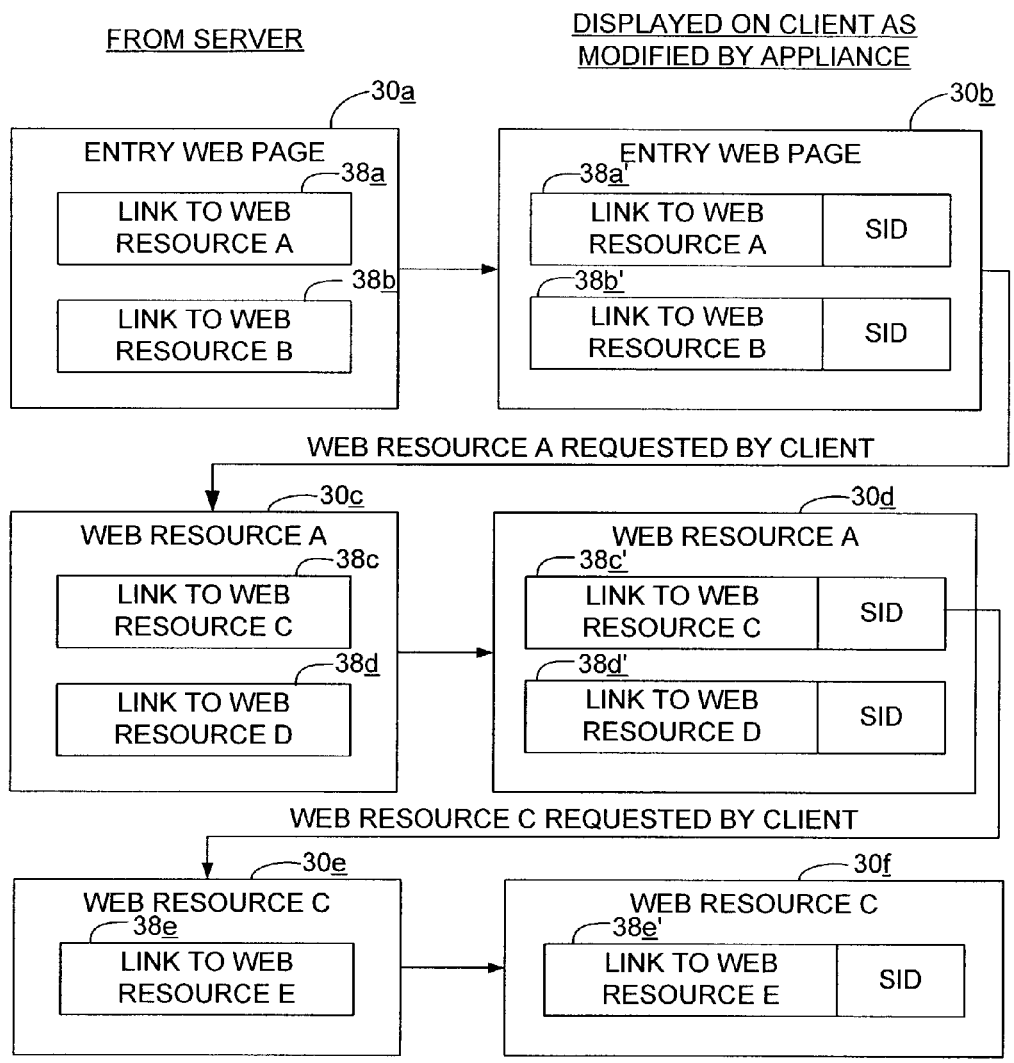
FIG. 9 is a flow diagram depicting a method for modifying web resources according to the present invention.

FIG. 9 depicts the modification of URL links in a requested resource in order to maintain a stateful interaction between the client and the server. In FIG. 9, the requested resource is an entry web page 30a including two links, a link 38a to web resource A and a link 38b to web resource B.

Typically, the appliance is configured to append the SID to all of the links included in the requested resource such that a client's movement may be tracked no matter which link is selected. Alternatively only a subset of the links may be appended. For example, when the appliance receives the requested resource from the server, the appliance may rewrite each URL in the resource to include the CSID in the URL string. Specifically, the anchor tag <a href=/index.html> might be rewritten to <a href=/index.html?SID=10001> to form a modified web resource 30b containing the SID 10001 within rewritten links 38a, 38b, so that when a user on a client browser selects that or any similarly rewritten link to request a subsequent web resource, the SID 10001 is included with the request.

Thus, when the user selects the rewritten URL link 38a' pointing to web resource A, the request for that web resource will automatically include the SID. This enables the appliance to recognize the SID. Where the SID is a CSID, the appliance is configured to match the CSID to the appropriate SSID and forward the request, including the SSID, to the appropriate server. Likewise, the server is configured to recognize the SSID and generate a customized web resource A, shown at 30c, based on the user's past behavior associated with the SSID. For example, the server may be configured such that any time the server receives a request originating from the modified entry web page 30b, links to other web resources C and D, shown at 38c, 38d, are added to the requested web resource 30c. The customized web resource A, shown at 30c, including links to web resources C and D is sent back to the appliance, where the URL links for web resources C and D are rewritten to include the SID, and a modified web resource 30d is generated containing rewritten links 38c' and 38d'.

The modified web resource A, shown at 30d, including the rewritten C and D links, is subsequently sent to the client. Should the user decide to view either web resource C, as shown at 30e, or web resource D by selecting the appropriate URL link, the request for the selected web resource will automatically include the SID. Where the SID is a CSID, the appliance is configured to recognize the CSID and forward the request with a matching SSID to the appropriate sticky server, where the requested resource can be further customized. In the example shown in FIG. 9, the resource C, at 30e, includes a link to resource E, at 38e. Once again, when the appliance receives resource C from the server on its way to the client, the appliance may modify the URL link for web resource E in the manner described above to include the SID, thereby creating rewritten link 38e'. The process can be repeated in this manner for as long as the user continues to select links that have been modified by the appliance to include the SID. By tracking the SID, the appliance is configured to monitor a session of interactions between a single client and the server.

As an alternative to rewriting URL links, the appliance may modify the requested web resource by rewriting the content location header in the resource to include an SID. As an example, the content location header might look something like "www.redlinenetworks.com/?CSID=10001". Upon receipt of the requested resource, the client browser could display the content location as the referrer. The appliance may be configured to use the SID 10001 embedded in the referrer code to identify the client. By using this approach, the appliance need only rewrite the header line for the resource instead of rewriting every URL in the resource.

Figure 10:
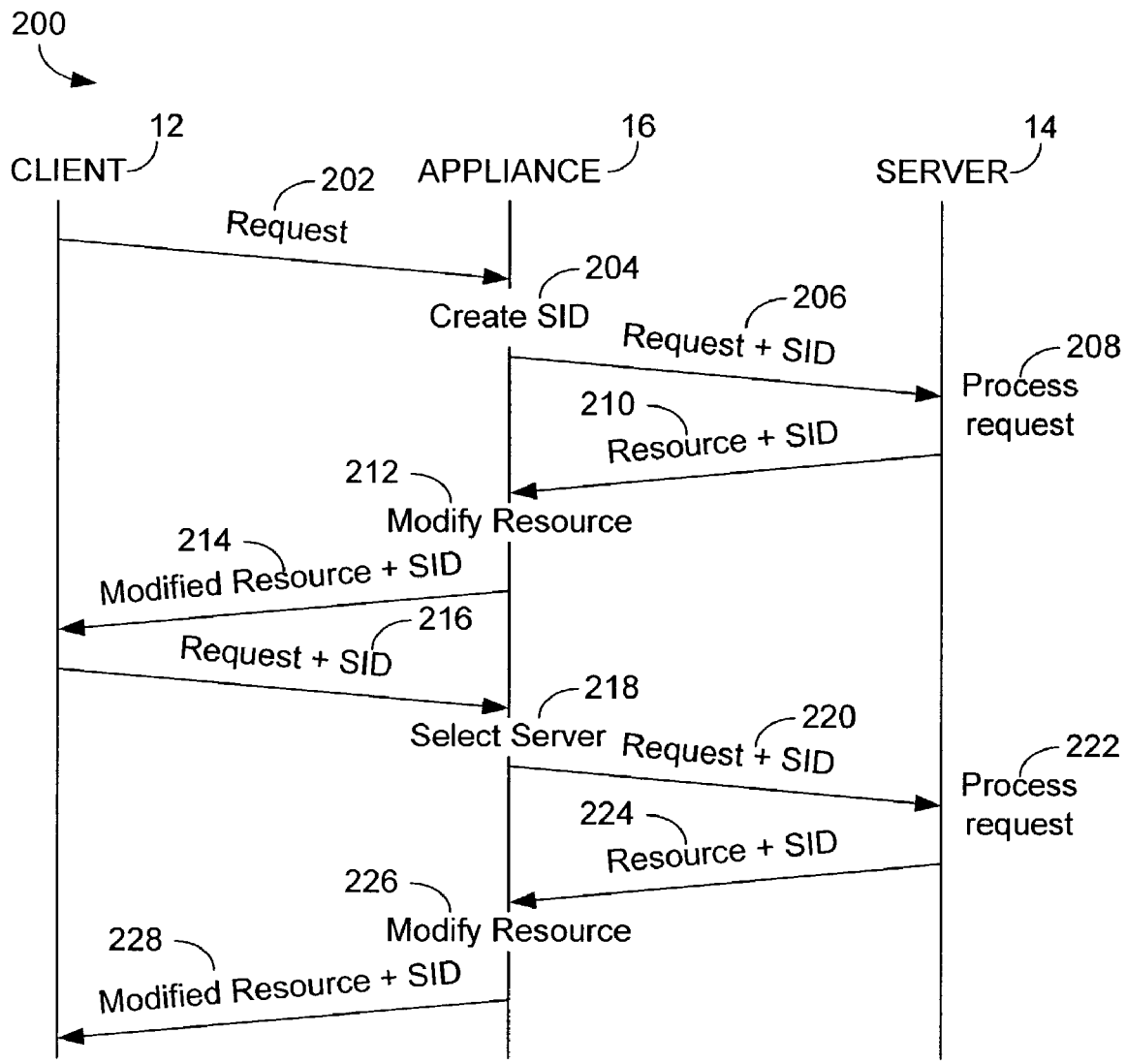
FIG. 10 is a diagram illustrating the messages exchanged between the client, the appliance, and the server when the appliance assigns a unique SID that is used to maintain statefulness.
Figure 11:
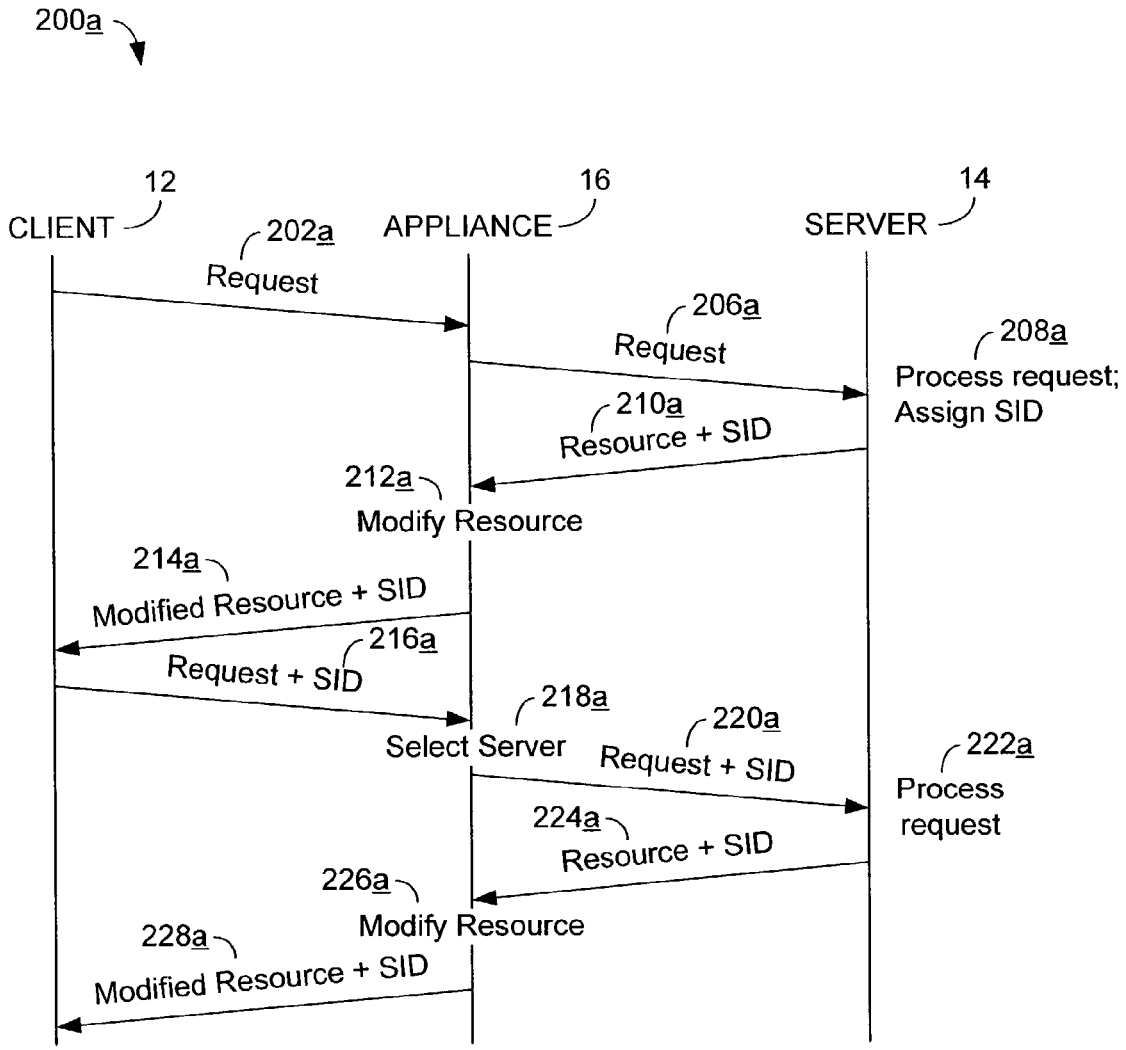
FIG. 11 is a diagram illustrating the messages exchanged between the client, the appliance, and the server when the server assigns a unique SID that is used to maintain statefulness.
Figure 12:
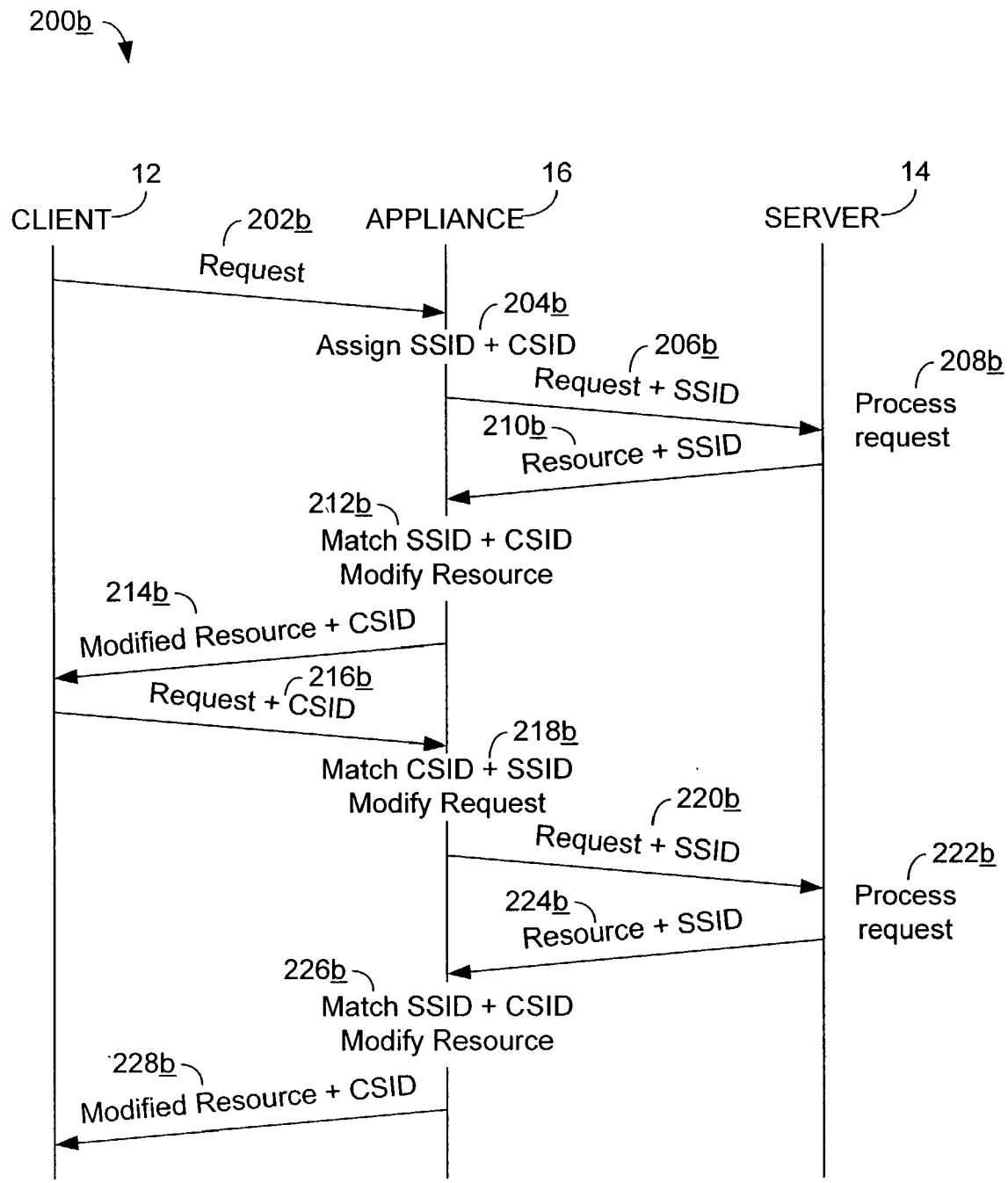
FIG. 12 is a diagram illustrating the messages exchanged between the client, the appliance, and the server when the appliance assigns a unique CSID and a unique SSID, which are used to maintain statefulness.
Figure 13:
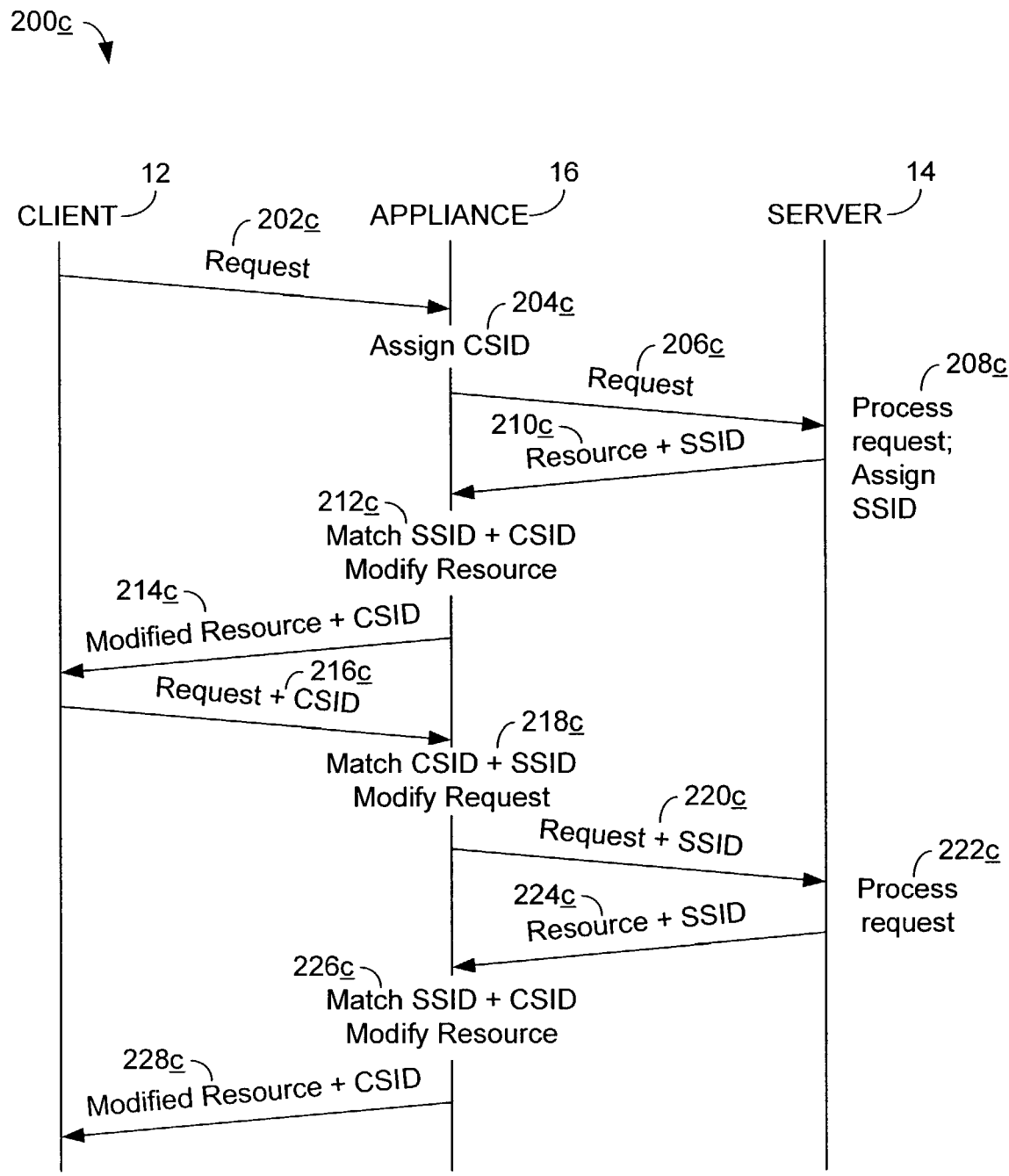
FIG. 13 is a diagram illustrating the messages exchanged between the client, the appliance, and the server when the appliance assigns a unique CSID and the server assigns a unique SSID, which are used to maintain statefulness.

FIGS. 10-13 are flow diagrams illustrating the messages exchanged between the client, server, and appliance where the SID, CSID and SSID are appended identifiers that are added to the requests and resources using one of the methods described above. FIG. 10 illustrates messages sent according to an embodiment of the invention in which a common SID is used (i.e., the CSID and SSID are identical), and the SID is assigned by the appliance. FIG. 11 illustrates an embodiment in which the SID is assigned by the server. FIG. 12 illustrates an embodiment in which the CSID and SSID are distinct, and both are assigned by the appliance. FIG. 13 illustrates an embodiment in which the CSID and SSID are distinct, and the CSID is assigned by the appliance and the SSID is assigned by the server.

Turning now to FIG. 10, a method for maintaining statefulness through a series of transactions between a client and a server over a computer network in accordance with one embodiment of the present invention is shown generally at 200. In method 200, a common SID is used (i.e., the CSID and SSID are identical), and the SID is assigned by the appliance.

Method 200 includes, at 202, sending a request from the client 12 to server 14. The method, at 204, includes creating an SID at the appliance 16, and, at 206, includes sending the SID, appended to the request, to server 14. At 208, the method includes processing the request at server 14. At 210, the method further includes sending the resource with the appended SID from server 14, back to appliance 16. Typically, the SID is sent appended to the URL for the requested resource, in a URL-encoded format. For example, the URL with the appended SID may read "http://www.redlinenetworks.com/?SID=10001."

At 212 the method includes modifying the requested resource to include the SID. This may be accomplished, for example, by rewriting the hyperlinks within the requested resource to include the SID, as described above. Typically all of the links are rewritten, but alternatively it will be appreciated that only a subset of the may be rewritten. For example, only links within the resource that return the user to the same organization's servers may be rewritten. At 214, the method includes forwarding the modified resource including the SID to the client, at which it is displayed to a user. Typically, no cookie or other data from the server 14 is stored on the client 12, apart from the modified web resource.

Upon selection of a rewritten link within the modified resource by the user, at 216, the method includes sending a second request to the appliance. The second request typically includes the SID appended to the URL of the requested web resource, as described above. At 218, the method includes selecting a target server for the request. The target server is typically selected based at least in part on the SID. Where server 16 is one of a plurality of servers in a server system, appliance 16 is typically configured to route the second request to the same server that handled the first request. At 220, the second request, plus the appended SID, is forwarded to server 16.

At 222, server 16 is configured to process the request and formulate a response, which is forwarded to the appliance at 224. The SID typically accompanies the response, as a URL-encoded string appended to the URL of the requested resource. At 226, the appliance is typically configured to modify the response, at the appliance, to include the SID in a manner that subsequent requests from the web resource will also include the SID. This is typically accomplished by rewriting the hyperlinks of the resource to include the SID in URL encoded form. At 228, the method typically includes sending the modified resource to client 12. This process repeats until the user ceases selecting links back to the same server. By modifying the web resource to include the SID appended to URLs within the web resource, the state of interaction over a series of transactions may be determined, without setting a cookie or storing other non-web resource data on the client computer.

FIGS. 11-16 illustrate embodiments similar to that described above for FIG. 10. Similar steps are numbered consistently with FIG. 10, and will not be redescribed for the sake of brevity.

FIG. 11 shows a method 200*a* in which the SID is assigned by the server. A request is sent at 202*a* from client 12 to appliance 16, and forwarded at 206*a* to server 14. At 208*a* the method includes processing the request and assigning an SID to the request at the server. At 210*a* the method further includes sending the resource plus the SID to the appliance. Typically, the SID is appended to the resource, for example, as a header, or in URL-encoded form as described above.

At 212*a*, the method includes modifying the resource, at the appliance, by rewriting the URL links of the resource to include the SID. In this manner, the appliance and server may keep track of a server session using the SID included in a header of the URL resource, while the appliance can track the session with the client using rewritten URL links. The modified resource with rewritten URL links including the SID is sent to the client at 214*a*.

When the user selects a rewritten link, the request with the SID is sent back to appliance 16 at 216*a*. The appliance is configured to read the SID and match the client session with an associated server session, and select at 218*a* an appropriate server to forward the request to at 220*a*. The request is then processed at the server and a response is sent back to the appliance, modified, and sent to the client, as shown at steps 222*a*-228*a*.

FIG. 12 illustrates a method 200*b* according to another embodiment of the present invention. Method 200*b* typically includes, at 202*b* receiving a request from client 12 at appliance 16. At 204*b*, the method includes assigning an SSID and a CSID at the client, the SSID being used to track session activity between server 14 and appliance 12, and the CSID being used to track session activity between client 12 and appliance 16. At 206*b*, the method typically includes sending the request plus the SSID to the server. Typically the SSID is appended to the URL, as described above. At 208*b*, the method further includes processing the request at the server. At 210*b*, the method includes sending a resource plus the SSID back to appliance 16. At 212*b*, the method includes matching the SSID and to a corresponding CSID, and modifying the resource to include the CSID instead of the SSID, in one of the manners described above. This is undertaken to prevent the client from being sent the SSID.

At 214*b*, the method includes sending the modified resource including the CSID to the client 12. At 216*b*, the method includes receiving a request sent from client 12 at the appliance, the request including the CSID. Typically, the CSID is embedded in a rewritten URL, and the request at 216*b* contains the CSID in a URL-encoded format. At 218*b*, the method includes matching the CSID to an SSID, and modifying the request to contain the SSID instead of the CSID. At 220*b*, the method includes sending the request with the SSID to the server, and at 222*b* the method includes processing the request. At 224*b*, the method includes sending a server-generated resource with the SSID back to the appliance. At 226*b* and 228*b*, the method includes matching the corresponding SSID and CSID, modifying the resource to include the CSID instead of the SSID, and sending the modified resource with the CSID to the client. These steps may be repeated to track related client-side sessions and server-side sessions without writing any cookie to client 12.

FIG. 13 shows a method 200*c* according to another embodiment of the present invention. Method 200*c* typically includes, at 202*c*, sending a request from client 12 to appliance 16. At 204*c*, the method typically includes assigning only a CSID to the request, and at 206*c*, forwarding the request to the server. At 208*c* the method includes processing the request and assigning an SSID to the request. The SSID is passed to the appliance, along with the requested resource, at 210*c*. At 212*c*, the method typically includes matching the SSID with the corresponding CSID assigned at 204*c*, and modifying the resource to include the CSID, in a manner described above. The modified resource, with the CSID, is sent to the client at 214*c*. In response to user-selection of a link (typically rewritten to include the CSID), a request, with the CSID, is sent to the appliance at 216*c*. Steps 218*c*-228*c* are accomplished in a manner to steps 218*b*-228*b*, described above.

Figure 14:
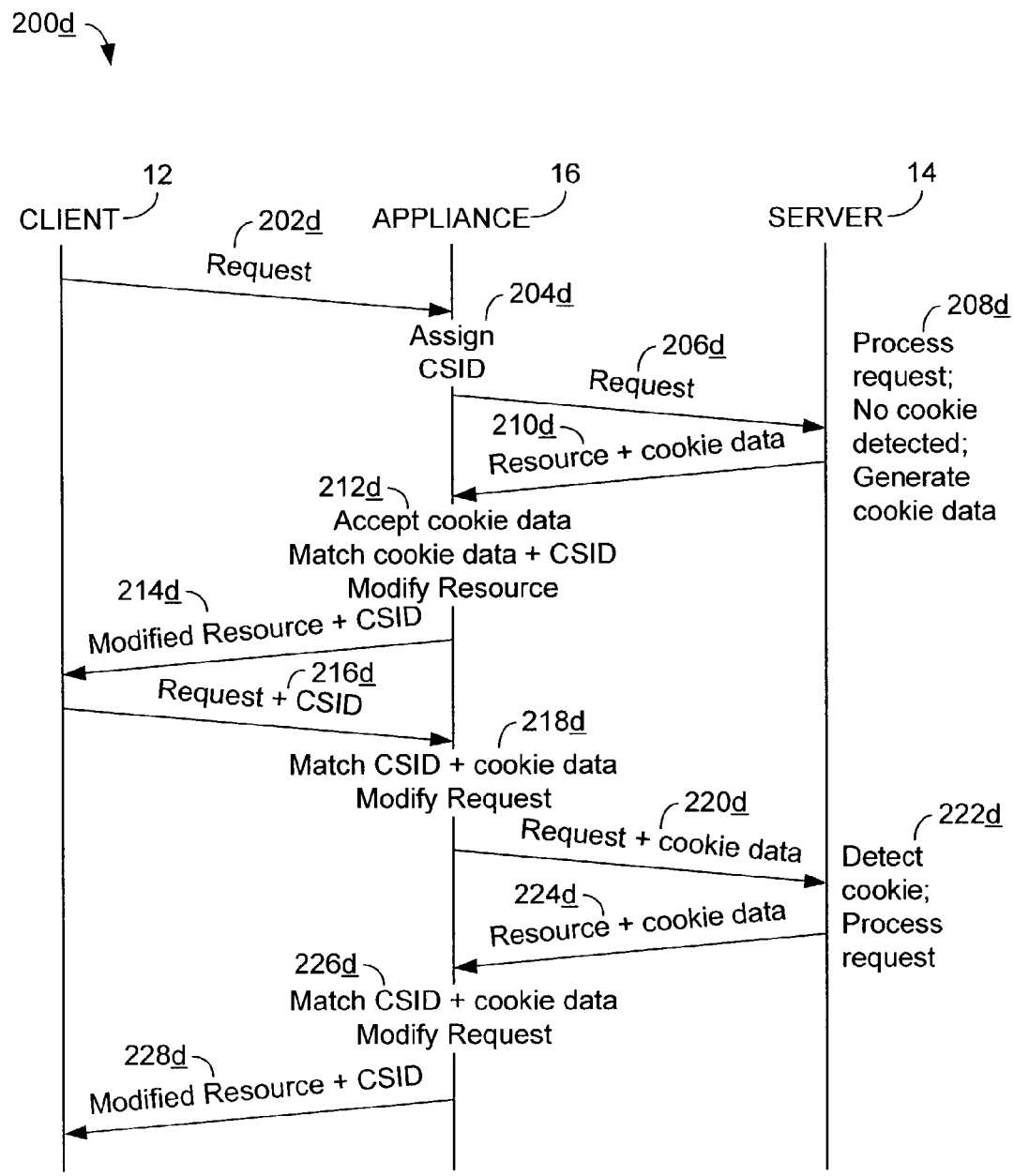
FIG. 14 is a diagram illustrating the messages exchanged between the client, the appliance, and the server when the SSID is a server-assigned cookie.
Figure 15:
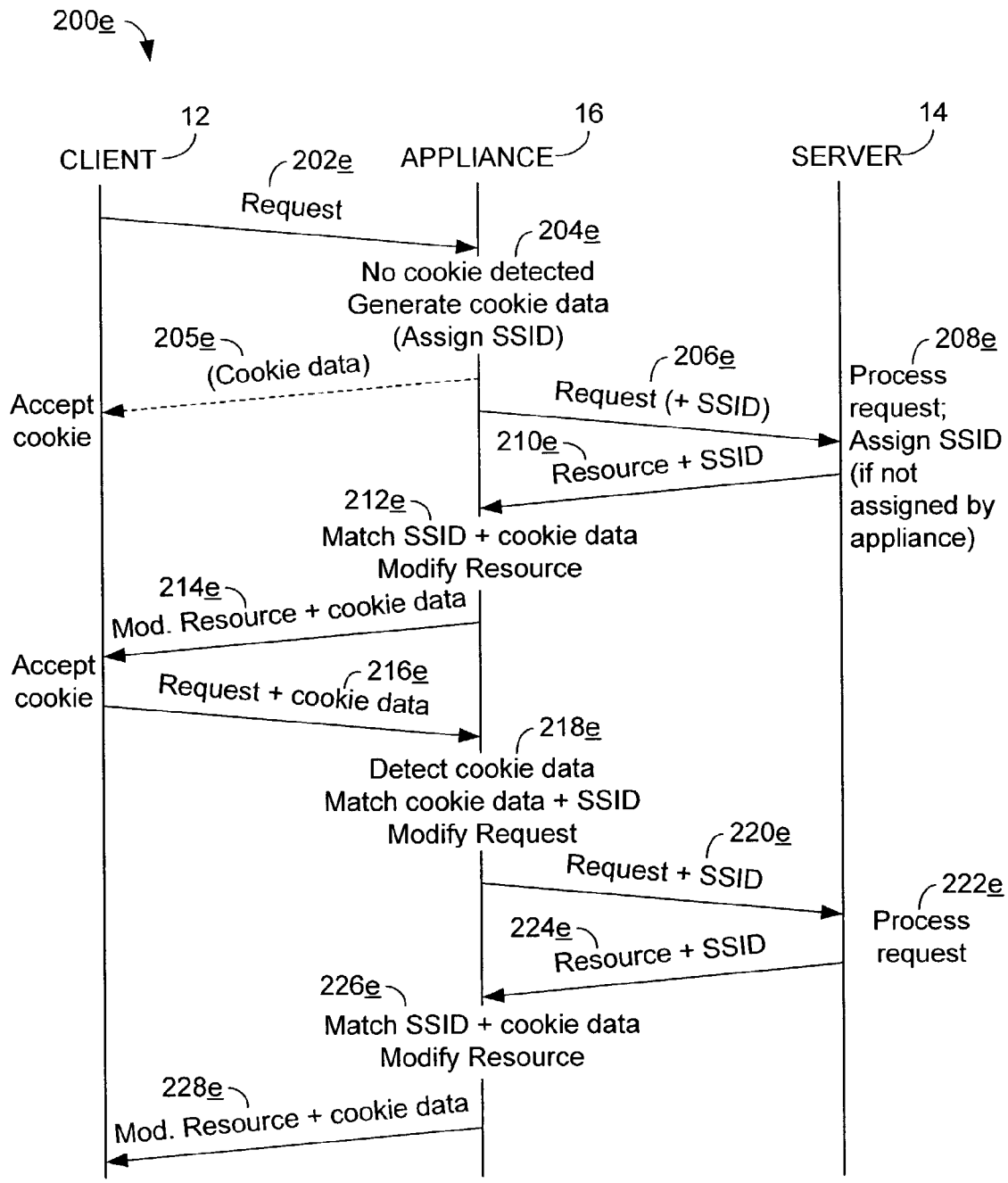
FIG. 15 is a diagram illustrating the messages exchanged between the client, the appliance, and the server when the CSID is an appliance-assigned cookie.
Figure 16:
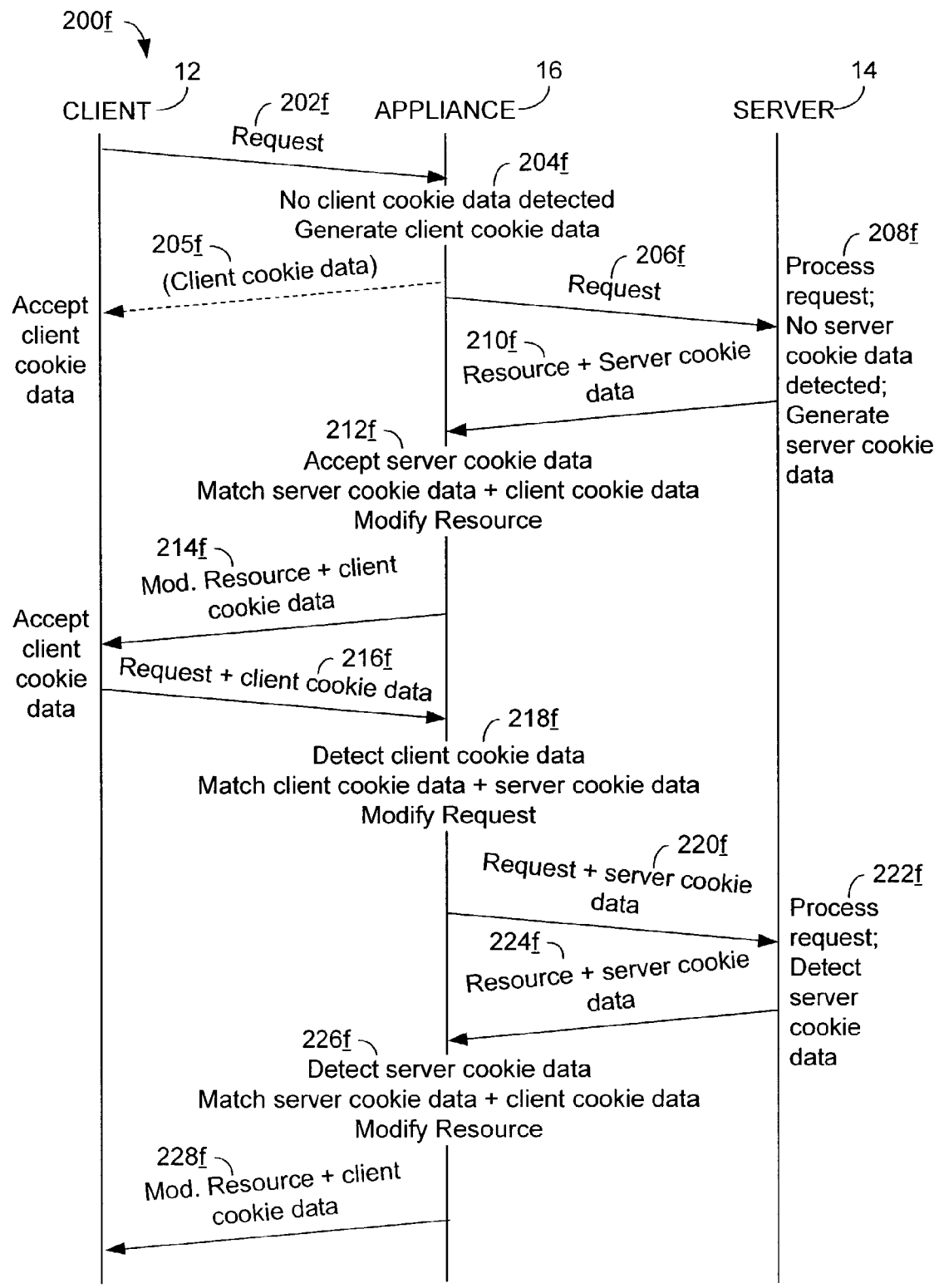
FIG. 16 is a diagram illustrating the messages exchanged between the client, the appliance and the server when the SSID is a server-assigned cookie and the CSID is an appliance-assigned cookie.

According to other embodiments of the invention illustrated in FIGS. 14-16, either one or both of the SSID and CSID may be a cookie. For example, the SSID may be a server-assigned cookie that is accepted and stored by the appliance on the client's behalf. This provides compatibility with servers that depend upon cookie dissemination while maintaining client anonymity and eliminating the requirement that the client machine accept or store the server's cookie(s). In this embodiment, the appliance acts as a proxy for the client and intercepts and stores the cookie on its own hardware.

As with a cookie exchange between a client and a server, if the client browser does not include an appropriate cookie in the request to the server, the server may set a new cookie on the appliance. When the server sets the cookie on the appliance, the appliance associates the cookie with the corresponding CSID and mediates all interactions between the client and the server. Thus, the server maintains state with the client through the use of cookies, possibly unaware that the cookies are not stored on the client machine.

FIG. 14 shows a method 200d in which the SSID is a cookie and the CSID is an appended identifier. Method 200d includes, at 202d, receiving a request for a web resource from client 12 at appliance 16. At 204d, the method includes appliance 16 assigning a CSID to the request. At 206d, the request is sent to the server.

At 208d, the method includes processing the request at the server. If no cookie data is detected, the server generates cookie data and sets a cookie on the appliance by sending the resource and the cookie data to the appliance at 210d. At 212d, the method includes accepting the cookie on the appliance, matching the cookie data to a corresponding CSID, and modifying the resource to include the CSID such that any subsequent requests will be recognized as originating from the resource, as described above. All cookie data is removed from the request. At 214d, the method includes sending the modified resource with the CSID to the client. In response to user-selection of a link in the resource, a request is generated having the CSID, and is sent back to the appliance at 216d.

At 218d, the method includes matching the CSID to the corresponding cookie, and modifying the request so that it no longer includes the CSID. At 220d, the method further includes sending the request and the corresponding cookie data back to the server. At 222d, the cookie data is detected and read, and the request is processed appropriately, based on the cookie data. At 224d, the method further includes, sending a resource back to the appliance, along with cookie data. At 226d and 228d, the cookie data is stripped and replaced with a matched CSID, which is sent in a modified resource to the client, similarly to steps 212d and 214d. As with the other embodiments, this process may be repeated as long as the user continues to make requests that include the CSID.

Method 200d can be integrated with current methods of maintaining statefulness without requiring changes in the operating procedures of presently existing servers. Thus, a server that uses cookies to maintain state can provide web resources in stateful transactions both (1) to clients that access the server via an intermediary appliance that strips the cookie data and replaces it with a CSID, and (2) to clients that access the server without the use of an intermediary appliance.

Turning now to FIG. 15, a method 220e according to another embodiment of the present invention is shown in which the CSID takes the form of a cookie that is stored on the client machine, not by the server, but by the appliance, and the SSID takes the form of a non-cookie identifier generated by the appliance or server. Thus, the client's identity is masked from the server and the server does not and need not place or query any information on the client because the appliance mediates all client-server interactions and provides to the server via the SSID any information needed to maintain a stateful interaction.

Method 200e typically includes, at 202e sending a request for a web resource from client 12 to appliance 16. At 204e, the method typically includes detecting that no cookie data accompanies the request for the client, and generating cookie data for the client at the appliance. This typically occurs when the client is making a new request to the server, at the beginning of a new server session. At 205e, the appliance-generated cookie data is sent back to the client, where it is accepted.

At 206e, the method typically includes sending the request from the appliance to server 14. At 208e, the method typically includes processing the request, and assigning a SSID to the request, at server 14. Alternatively, it will be appreciated that the SSID may be assigned by the appliance at step 204e, and sent along with the request to the server at step 206e.

At 210e, the method includes sending back a server-generated web resource in response to the request, along with the SSID. The SSID may be appended to the resource, or associated with the resource in another suitable manner, as described above. At 212e, the method includes, at the appliance, matching the SSID with corresponding cookie data from the originating client, and modifying the resource such that it no longer includes the SSID. At 214e, the modified resource is sent along with the matched cookie data from the appliance 16 to the originating client 12.

A user typically generates a subsequent request at the client based on the resource, which is sent to the appliance along with cookie data, at 216e. At 218e, the method typically includes detecting the cookie data and matching the cookie data to the SSID corresponding the server session for the originating client. In addition, the appliance typically modifies the request to include the SSID, by for example, appending the SSID to the request. At 220e, the request and SSID are sent from the appliance to the server, where the request is processed, as shown at 222e, generating a resource in response to the request.

At 224e, the method typically includes sending the server-generated resource and the SSID back to the appliance. At 226e, the method typically includes matching the SSID and the cookie data, and modifying the resource so that it no longer includes the SSID. At 228e, the method includes sending the modified resource and the matched cookie data back to the client. By repeating steps 216e-228e, the client and server may communicate via appliance 16, with cookies being used on the client side to track statefulness, and server—or appliance—generated URL-encoded SSIDs being used on the server side to track statefulness.

Turning now to FIG. 16, a method 220f according to another embodiment of the present invention is shown in which both the CSID and the SSID take the form of separate client-side and server-side cookies. In this embodiment, the client's identity is masked from the server and the server need not place or query any information on the client, because the appliance is acting as a cookie proxy server.

At 202f, method 200f typically includes sending a new request for a web resource from client 12 to appliance 16. At 204f, the method further includes detecting at the appliance that no cookie exists for the client 12, and generating cookie data for the client. At 205f, the method includes sending the cookie data back to the client, where it is accepted.

At 206f, the request is sent from the appliance to the server. At 208f, the method includes processing the request and generating a web resource in response, and also assigning server-side cookie data for the request. At 210f, the method further includes sending the resource and server-side cookie data to appliance 16.

At 212f, the method further includes accepting the server-side cookie data, and matching the server-side cookie data to client-side cookie data generated at 204f, and modifying the resource to not be associated with any server side-cookie data and instead to be associated with client-side cookie data. In essence, the appliance acts as a cookie proxy.

At 214f, the method includes sending the modified resource and client-side cookie data to the client, where the cookie is accepted. At 216f, the method typically includes sending a subsequent request from the client to the appliance, along with client-side cookie data. At 218f, the method includes matching client-side cookie data to server side cookie data for the appropriate server session, and modifying the request so that is not associated with any client-side cookie data, and so that it is associated with the server-side cookie data. At 220f, the modified request and server cookie data are sent from the appliance to the server.

At 222f, the method further includes detecting the server-side cookie data, and processing the request based in part on the cookie data, to thereby generate a web resource in response the request. At 224f, the method further includes sending the server-generated resource to the appliance along with server-side cookie data. At 226f, the method further includes detecting the server-side cookie data, matching it with corresponding client-side cookie data, and modifying the resource so that it is no longer associated with any server-side cookie data and so that it is associated with the client-side cookie data. At 228f, the method includes sending the modified resource and client-side cookie data to the client. It will be appreciated that steps 216f-228f may be repeated to enable the server and client to communicate via the appliance, with no exchange of cookies between the server and client directly, but rather with each of the server and client exchanging cookies with the cookie proxy, appliance 16. Thus, statefulness can be maintained over a series of sessions because the cookies can be stored more or lest permanently on the host machines, and the appliance can associate a client-side cookie with a corresponding server-side cookie over multiple sessions.

Thus, the present invention provides a system adapted to provide stateful interactions between clients and servers via an intermediate appliance. Because the appliance mediates all interactions between the client and the server, statefulness can be maintained without the server being required to directly store or query any information on the client. In fact, the present invention enables statefulness to be maintained without the server ever receiving any information about the identity or location of the client.

While the present invention has been particularly shown and described with reference to the foregoing preferred embodiments, those skilled in the art will understand that many variations may be made therein without departing from the spirit and scope of the invention. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

What is claimed is:

1. A system for maintaining statefulness through a series of transactions between a client and a server over a computer network without having the server query and/or store any information on the client, the system comprising:
    an appliance situated between the client and the server on the computer network, the appliance being configured to:
    intercept a response containing a web resource being sent to the client from the server in response to a request from the client, wherein the web resource includes a server session identifier assigned by the server;
    remove the server session identifier and modify the web resource to include a client session identifier that is different from the server session identifier and assigned by the appliance such that any subsequent requests originating via the modified web resource can be identified by the appliance as originating from the same client to which the intercepted response was directed;
    send the modified web resource to the client;
    receive subsequent requests from the client that include the client session identifier;
    determine that the client session identifier assigned by the appliance is associated with the server session identifier assigned by the server to identify the subsequent requests as originating from the modified web resource;
    modify the subsequent requests originating from the modified web resource to include the server session identifier that is recognizable by the server; and
    forward the subsequent requests to the server.

2. The system of claim 1 wherein the computer network includes a plurality of servers and the appliance is further adapted to select which of the plurality of servers to send the request to based on the session identifier.

3. The system of claim 1 wherein the appliance assigns the client session identifier and the server session identifier.

4. The system of claim 1 wherein the client session identifier is added to one or more Uniform Resource Locator (URLs) in the resource.

5. The system of claim 1 wherein the client session identifier is added to a content location header for the resource.

6. The system of claim 1 wherein the server assigns the server session identifier by setting a cookie on the appliance.

7. A method for directing client requests to an appropriate server in a computer network including a plurality of servers, the method comprising:
    intercepting a requested web resource sent from the a first server to a client before the resource reaches the client, wherein the web resource includes a server session identifier;
    generating with the intermediate device a client session identifier that uniquely identifies the client, wherein the client session identifier is different from the server session identifier;
    modifying the requested web resource with the intermediate device to remove the server session identifier and to include the client session identifier such that any subsequent requests originating by the client from the modified resource can be identified by the intermediate device as originating from the same client to which the intercepted response was directed;
    sending the modified web resource from the intermediate device to the client;
    receiving with the intermediate device a new request for a second web resource from the remote client;
    determining that the new request originated from the modified web resource by determining with the intermediate device whether the client session identifier that maps to the server session identifier is present in the new request; and when the client session identifier is present in the new request, modifying the new request with the intermediate device to include the server session identifier and sending the new request in modified form to the first server.

8. The method of claim 7 wherein the computer network includes a plurality of servers, the method further comprising selecting which of the servers to send the second request to based on the session identifier.

9. The method of claim 7 further comprising adjusting the content of the second requested web resource based on the session identifier.

10. The method of claim 7 wherein modifying the requested web resource includes modifying all Uniform Resource Locators (URLs) in the resource to include the client session identifier.

11. The method of claim 7 wherein modifying the requested web resource includes modifying a content location header for the resource to include the client session identifier.

* * * * *